United States Patent [19]

Bobo et al.

[11] 4,157,232

[45] Jun. 5, 1979

[54] TURBINE SHROUD SUPPORT

[75] Inventors: Melvin Bobo, Cincinnati; Charles F. Riedmiller, Greenhills, both of Ohio

[73] Assignee: General Electric Company, Cincinnati, Ohio

[21] Appl. No.: 846,956

[22] Filed: Oct. 31, 1977

[51] Int. Cl.² ............................................. F02C 7/18
[52] U.S. Cl. .................................. 415/116; 415/199.5
[58] Field of Search ............... 415/115, 116, 117, 175, 415/178, 199.5

[56] References Cited

U.S. PATENT DOCUMENTS

| | | | |
|---|---|---|---|
| 2,859,934 | 11/1958 | Halford et al. | 415/115 |
| 3,583,824 | 6/1971 | Smuland et al. | 415/117 |
| 4,023,731 | 5/1977 | Patterson | 415/116 |

Primary Examiner—Louis J. Casaregola
Attorney, Agent, or Firm—Dana F. Bigelow; Derek P. Lawrence

[57] ABSTRACT

Hot gas recirculation is eliminated between the trailing edge of a turbine shroud and the leading edge of a downstream vane by a tongue-and-groove interconnection between the two parts and a passage of cooling air through the interconnection to exhaust against the vane outer band and flow into the main gas stream. The shroud with its supporting structure is thereby maintained at substantially uniform temperatures around its circumference so as to present a round, close-tolerance relationship to its circumscribed turbine blade row.

11 Claims, 5 Drawing Figures

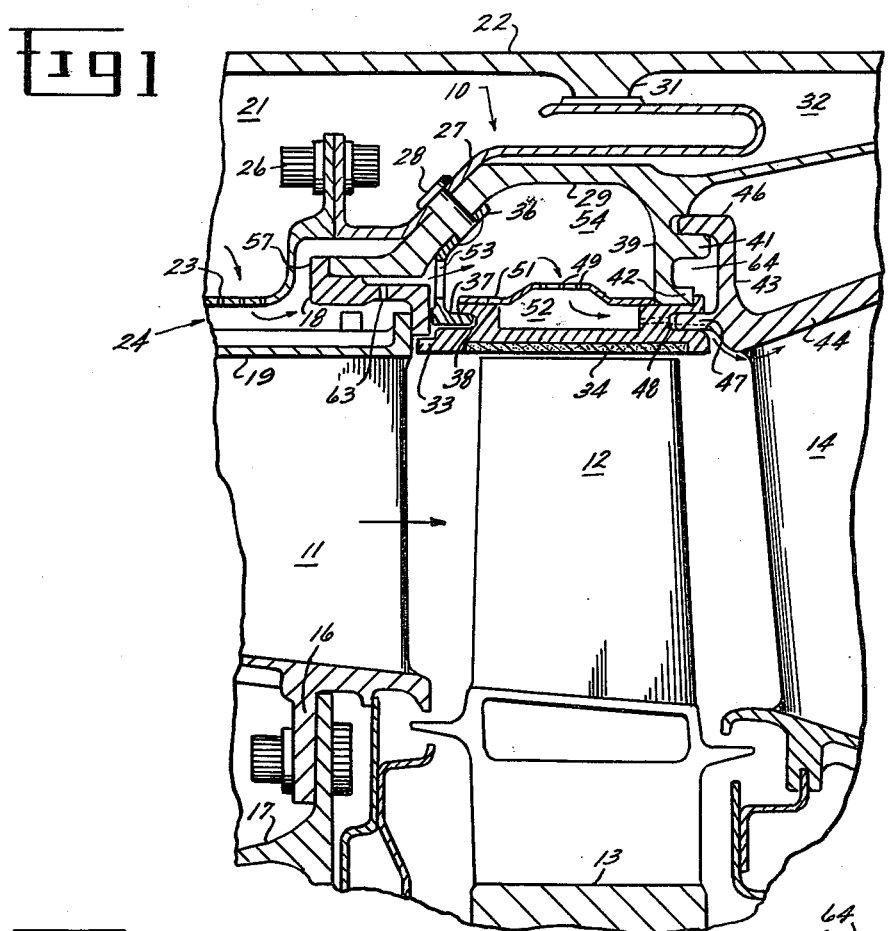
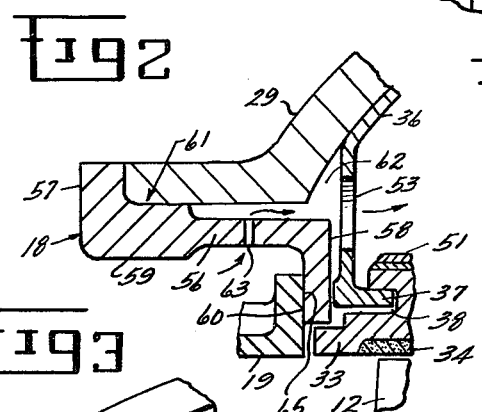
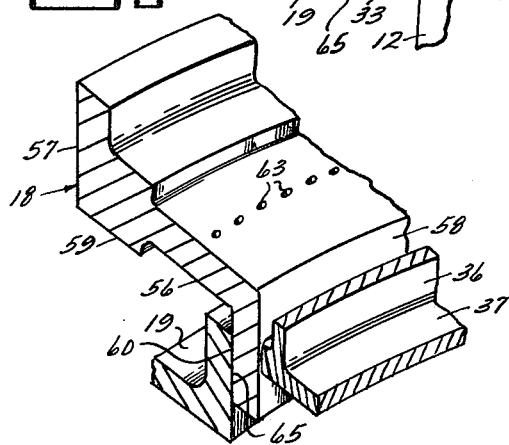
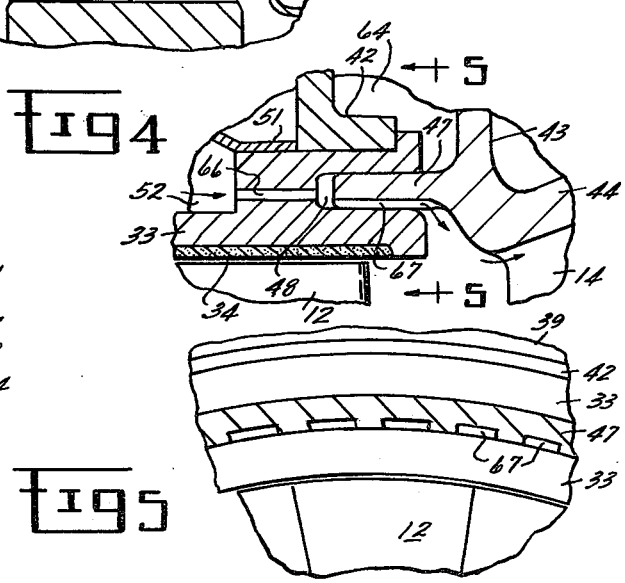

ns shroud support

BACKGROUND OF THE INVENTION

This invention relates generally to gas turbine engines and, more particularly, to clearance control of the turbine section thereof.

Turbine efficiency is directly related to the maintenance of a minimum clearance between the rotating turbine and its associated stationary shroud. Execessive clearances between the components represent a direct performance loss, and interference between the components results in wear to one or both and subsequent excessive clearance operation at other performance levels. Ideally, both the turbine structure and its surrounding shroud are round in shape with minimal clearance between the two components. However, if either the turbine or the shroud becomes "out of round", an excessive clearance gap, or an interference or both, will occur. Such an out-of-round condition may occur from either mechanical or thermal nonuniformities in the circumference of the shroud or its supporting structure. It is therefore essential to maintain substantially uniform temperatures around the circumference of such supporting structures.

The transition cavities between rotating turbine stages and their stationary vanes are subject to hot gas recirculation which represents a loss of available, useful energy and exposes the stationary parts to nonuniform circumferential temperatures which, in turn, cause them to become out of round. In addition to the resulting loss of optimum clearances, discoloration, erosion and cracking of the stationary elements results in these regions of stagnation.

It is therefore an object of the present invention to maintain a minimum clearance throughout the circumference of a turbine blade/shroud combination.

Another object of the present invention is the provision for a turbine shroud structure which maintains a substantially round profile over a range of operating conditions.

Yet another object of the present invention is the provision in a turbomachine for the elimination of hot gas recirculation in the vicinity of the turbine shroud/vane transition area.

Still another object of the present invention is the provision in a turbomachine for preventing the flow of the hot gas stream between the interconnection of the turbine shroud and associated downstream vane.

Another object of the present invention is the provision for preventing the hot gas leaving the rotating stage from stagnating against the leading edge of the downstream nozzles.

Still another object of the present invention is the provision in a turbomachine for a turbine shroud/vane interconnection which is economical to fabricate and effective in use.

These objects and other features and advantages become more readily apparent upon reference to the following description when taken in conjunction with the appended drawings.

SUMMARY OF THE INVENTION

Briefly, in accordance with one object of the present invention, a turbine shroud has formed in the rear edge thereof a groove for receiving in close-fit relationship a tongue or flange projecting forwardly from the outer band of the downstream vane. This close-fit relationship prevents the hot gases from the main gas stream from passing between the shroud and the vane band and thereby maintains the support structure located radially outwardly therefrom at a substantially uniform temperature around its circumference. This temperature uniformity in turn provides for the maintenance of a substantially round profile and minimum clearances.

By another aspect of the invention, the outer band flange comprises a part of a C-clamp integrally connected to the outer band for clamping the shroud securely to a surrounding nozzle support structure. The nozzle support structure has a pair of rearwardly extending flanges which are sandwiched between the outer flange of the C-clamp and the outer surfaces of the shroud. In this way, the nozzle support structure provides radial support for both the shroud and the downstream band.

By yet another aspect of the invention, provision is made to flow cooling air into the tongue-and-groove connection so as to flush out the areas which are susceptible to stagnation and then flow into the gas stream to do more useful work. A plurality of axially extending passages are formed in the shroud to provide fluid communication between the outer side of the shroud and the rear edge groove. Further, a plurality of circumferentially spaced, axially extending slots are formed in the inner surface of the vane flange to provide fluid communication between the groove and the leading edge of the vane outer band. Flow of air along this path further prevents the stagnation of air in the transition area by its flushing action. The cooling air which then enters the main gas stream tends to provide a film of air around the outer band leading edge of the airfoil to aid in cooling.

In the drawings as hereinafter described, a preferred embodiment is depicted; however, various other modifications and alternate constructions can be made thereto without departing from the true spirit and scope of the invention.

BRIEF DESCRIPTION OF THE DRAWINGS

FIG. 1 is a fragmented axial sectional view of the turbine and vane portion of a turbomachine in which the present invention is embodied.

FIG. 2 is an enlarged view of the support ring portion thereof.

FIG. 3 is a fragmented perspective view of the support ring portion thereof.

FIG. 4 is an enlarged view of the C-clamp/shroud portion of the FIG. 1 apparatus.

FIG. 5 is a sectional view thereof as seen along line 5—5 of FIG. 4.

DESCRIPTION OF THE PREFERRED EMBODIMENT

Referring to FIG. 1, the invention is shown generally at 10 as incorporated into the turbine section of a gas turbine engine. A first stage high pressure nozzle or vane 11 receives high pressure gas from the combustor and directs it onto the first stage high pressure turbine blades 12 which act to convert the thermal energy into kinetic energy by way of rotating the turbine disk 13 in a conventional manner. The first stage nozzle 11 is bolted at its inner band 16 to the first stage support 17 which provides both radial and axial support therefor as well as forming the inner flow path wall from the compressor rear frame to the nozzle. Axial support is also provided at the outer diameter of the vane 11 by way of a ring 18 which engages the rear side of the outer band 19. The hollow vanes 11 are cooled by compressor discharge air which enters the plenum 21, which is defined on its outer side by the compressor rear frame 22, and passes through an impingement plate 23 into a cavity 24 to enter the hollow blades and be discharged from a plurality of leading edge holes, gill holes and trailing edge slots in a manner well known in the art. The impingement plate 23 is secured by a plurality of bolts 26 to a seal 27 which in turn is secured by a plurality of bolts 28 to the stage 2 nozzle support 29. The seal 27 is an annular device which extends radially outward to engage a pad 31 on the compressor rear frame 22 so as to thereby isolate from the plenum 21 a rear plenum 32 which contains cooling air at a lower pressure and temperature from that of the plenum 21.

Located radially outward from the row of turbine blades 12 is a plurality of circumferentially spaced shroud segments 33. The shroud segments 33 are closely spaced from the turbine blades 12 to prevent leakage of the hot gases therebetween, and contain a section of material 34 directly opposite the turbine blade row so constituted as to allow occasional interference between the components without attendant wear of the turbine blades with unstable wear conditions prevailing. Support for the shroud segments 33 is provided on the forward end by a plurality of shroud support segments 36 which are connected to the stage 2 nozzle support 29 by the fasteners 28, and which extend radially inwardly to terminate in an axial flange 37 which fits into a forward groove 38 of the shroud to provide positive radial placement of the shroud. Support at the rear end of the shroud segment is provided by a rim 38, forming an integral part of and extending inwardly from the stage 2 nozzle support 29 and having outer and inner flanges 41 and 42. Also forming a part of the support structure is a C-clamp 43 which forms an integral part of and extends forwardly of the outer band 44 of the second stage nozzle 14. The rim inner flange 42 abuts the outer side of the shroud segments 33 and the C-clamp 43 fits into the combination such that its outer flange 46 closely engages the outer side of the rim outer flange 41, and its inner flange 47 fits into the rear groove 48 of the shroud segment. In this way, the C-clamp 43 holds together the shroud 33 and the stage 2 nozzle support 29 such that the shroud 33 moves radially with the nozzle support 29. Similarly, the forward end of the shroud 33 is also radially positioned with the nozzle support 29 by virtue of the rigid shroud support segment 36. Thus, the radial position of the shroud 33 is dependent on the radial position of the stage 2 nozzle support 29 which, in turn, is dependent primarily on its temperature. Generally, at lower speeds the compressor discharge air is cooler and the nozzle support 29 will assume a relatively inward position whereas at higher speeds, when the compressor discharge air is at a higher temperature, the nozzle support 29 will assume a relatively outward position. For steady-state operation, this accommodates a similar characteristic in the operational position of the turbine blades so as to result in the maintenance of a minimum clearance between the two components.

The shroud segments 33 are cooled by way of cooling air which enters a plurality of small holes 49 in an impingement of plate 51 which is secured to the outer side of the shroud segment 33 by way of brazing or the like. The air then enters the cavity 52 and impinges on the outer side of the shroud segment 33 to cause cooling thereof. The cooling air originates in the compressor and passes through a plurality of ports 53 in the shroud support segment 36 to enter the plenum 54 surrounding the baffle plate 51.

Referring now to FIGS. 2 and 3, the ring 18 comprises an axially aligned section 56 and forward and rear radial sections 57 and 58, respectively, to define a generally S-shaped cross section. The axially aligned section 56 has an enlarged section 59 whose outer periphery forms a pad 61 for closely engaging with an interference fit, the nozzle support 29 at its inner side. At the same time, the rear surface of the radial section 57 fits tightly against the front surface of the nozzle support 29. In this way, both the radial and the axial positions of the ring 18 are fixed by the support 29. The axial length of the section 56 is established so that the forward surface 60 of the rear radial section 58 abuts the rear side 65 of the vane outer band 19 so as to provide axial support therefor. It will, therefore, be recognized that as the vane 11 is loaded, the axial load will be transmitted to the nozzle support 29 by way of the rear radial section 58, the axial section 56 and the rear radial section 58 of the ring 18. At the same time, since the rear surface 65 of the vane outer band 19 is allowed to slide over the forward surface 60 of the rear radial section 58, the tendency for the radial loads to be transferred from the vane to the ring, and hence to the support 29, are minimized.

As can be seen by reference to FIG. 2, a cavity 62 is generally defined by the ring 18, the nozzle support 29, and the shroud support segments 36. Airflow communication is provided between this cavity 62 and the cavity 24 (FIG. 1) by a plurality of holes 63 which are properly sized to meter the air which flows by way of the ports 53 and the plenum 54 to cool the shroud structure. In addition, this row of holes as can be seen in FIG. 3 acts to isolate the upstream end of the ring axial section 56 from the thermal variations in the downstream end thereof. That is, since the ring rear radial section 58 is partially exposed to the hot gas stream, it is subject to temperature variation and to nonuniform circumferential temperature gradients. However, the row of holes 63 tends to form a barrier which prevents these temperatures from migrating to the enlarged section 59 of the ring and, hence, to the nozzle support 29 to cause nonuniformity in the circumference of the nozzle support 29 and of the shroud segments 33. It should be noted that the location of the holes 63 could be moved upstream or downstream on the ring, or could even be located in the nozzle support 29 itself.

Referring now to FIGS. 4 and 5, the C-clamp inner flange 47 is shown to be in a close-fit relationship with the shroud rear groove 48 so as to thereby assist in clamping the shroud segment 33 to the rim inner flange 42 so as to accurately control the radial position of the shroud 33. This close-fitting, interlocking relationship between the shroud and the rim inner flange 47 further prevents the hot flow path gases from flowing radially outward into the cavity 64 defined by the C-clamp 43 and the rim 39. Therefore, the cavity 64, the rim 39 and the support 29, as well as the adjacent rim outer flange 41, remain at a uniform cool temperature to maintain the vane and shroud in a substantially stable radial position. Since the C-clamp inner flange 47 is positioned close to the main gas stream, the transition cavities are essentially eliminated and hot gas recirculation is prevented so as to retain the motive energy within the hot gas flow path.

As can be seen by reference to FIG. 4, there is an area between the shroud segment 33 and the vane outer band 44 where the hot gas leaving the rotating stage is susceptible to stagnating against the leading edge of the nozzle. However, in order to prevent this, the air which is used to cool the shroud is further used to prevent or reduce this hot gas recirculation. A plurality of axially extending, circumferentially spaced holes 66 are formed in the shroud so as to fluidly connect the cavity 52 to the shroud rear groove 48. Further, a plurality of axially extending, circumferentially spaced slots 67 are formed in the inner edge of the C-clamp inner flange 47 so as to provide fluid communication between the shroud rear groove 48 and the leading edges of the stage 2 vanes. This structure allows the cooling air from the outer side of the shroud to flow through the holes 66, circumferentially around the shroud rear groove 48, through the slots 67, and into the area where the hot gas recirculation would otherwise occur. The cooling air then flows around the outer band leading edges to provide additional hot spot cooling and then re-enters the gas stream to do additional useful work. Proper alignment of the slots 67 with that region susceptible to airfoil stagnation, tends to flush out those regions and thereby maintain uniform temperatures and radial positions of the shroud and support structures.

Although the invention has been shown and described in terms of a preferred embodiment, it should be understood by those skilled in the art that various changes and omissions in the form and detail may be made therein without departing from the true spirit and scope of the invention.

Having thus described the invention, what is considered novel and desired to be secured by Letters Patent of the United States is:

1. In a turbomachine of the type having in adjacent serial flow relationship a turbine shroud and a vane outer band collectively defining a portion of the outer flow path for the motive fluid, an improved sealing and support arrangement comprising:
   (a) an annular slot formed in the rear edge of the shroud;
   (b) a nozzle support structure disposed radially outside of and having an inner flange in engagement with a radially outer surface of the shroud, and said support structure further having an outer annular support flange; and
   (c) a C-clamp attached to the vane outer band, said C-clamp comprising integrally connected outer and inner flanges, said inner flange extending axially forward into said shroud annular slot and said outer flange extending axially forward in overlapping relationship with said outer annular support flange so as to jointly clamp the shroud to said nozzle support structure.

2. The improved sealing and support arrangement as set forth in claim 1 and including a plurality of holes formed in said shroud for conducting the flow of cooling air from a source on its radially outer side to impinge on said C-clamp inner flange.

3. The improved sealing arrangement as set forth in claim 2 wherein said holes lead into said annular slot.

4. The improved sealing arrangement as set forth in claim 2 and including a plurality of circumferentially spaced scallops formed on the radially inner periphery of said inner flange to provide fluid communication between said plurality of holes and the forward edge of the vane outer band.

5. The improved sealing arrangement as set forth in claim 1 wherein overlapping contact is maintained with a defining surface of said annular slot by the radially inner side of said inner flange for at least a portion of the circumferential length of said flange.

6. The improved sealing arrangement as set forth in claim 5 and including a plurality of holes formed in said shroud for conducting the flow of cooling air from a source on its radially outer side to the radially inner side of circumferential portions of said inner flange.

7. The improved sealing arrangement as set forth in claim 5 and including a plurality of circumferentially spaced scallops formed on the inner periphery of said inner flange so as to constitute circumferential discontinuities in the overlapping contact with said defining surface for providing fluid communication between said plurality of holes and the forward edge of the vane outer band.

8. The improved sealing arrangement as set forth in claim 7 and including a plurality of holes formed in said shroud for conducting the flow of cooling air from a source on its radially outer side to said plurality of circumferentially spaced scallops.

9. The improved sealing arrangement as set forth in claim 8 wherein said plurality of circumferentially spaced scallops are situated so as to discharge cooling air for impingement against the forward edge of the vane outer band.

10. The improved sealing arrangement as set forth in claim 1 and including a plurality of holes formed in said shroud for conducting the flow of cooling air from a source on its radially outer side to said annular slot.

11. The improved sealing arrangement as set forth in claim 10 and including a plurality of circumferentially spaced scallops formed on the inner periphery of said inner flange to provide fluid communication between said plurality of holes and the motive fluid outer flow path.

* * * * *